US012658720B2

(12) United States Patent
Qureshi

(10) Patent No.: US 12,658,720 B2
(45) Date of Patent: Jun. 16, 2026

(54) CAPACITOR CELL BASED ENERGY STORAGE SYSTEM WITH ARRAY OF SWITCHES

(71) Applicant: Enercap Energy Holdings Limited, Abu Dhabi (AE)

(72) Inventor: Waseem Ashraf Qureshi, Dubai (AE)

(73) Assignee: Enercap Energy Holding Limited

( * ) Notice: Subject to any disclaimer, the term of this patent is extended or adjusted under 35 U.S.C. 154(b) by 0 days.

(21) Appl. No.: 19/090,033

(22) Filed: Mar. 25, 2025

(65) Prior Publication Data

US 2025/0309661 A1 Oct. 2, 2025

Related U.S. Application Data

(60) Provisional application No. 63/570,171, filed on Mar. 26, 2024, provisional application No. 63/570,163, filed on Mar. 26, 2024, provisional application No. 63/570,150, filed on Mar. 26, 2024, provisional application No. 63/570,131, filed on Mar. 26, 2024.

(51) Int. Cl.
| | |
|---|---|
| *H02J 7/00* | (2026.01) |
| *H02J 7/40* | (2026.01) |
| *H02J 7/52* | (2026.01) |
| *H02J 7/80* | (2026.01) |

(52) U.S. Cl.
CPC .................................... *H02J 7/52* (2026.01); *H02J 7/40* (2026.01); *H02J 7/80* (2026.01); *H02J 2207/50* (2020.01)

(58) Field of Classification Search
CPC ....................................................... H02J 7/0014
USPC ........................................................ 320/166
See application file for complete search history.

(56) References Cited

U.S. PATENT DOCUMENTS

| | | | | |
|---|---|---|---|---|
| 6,064,178 A * | 5/2000 | Miller | .................. | H02J 7/0016 320/117 |
| 6,159,788 A | 12/2000 | Jenq et al. | | |
| 2004/0150926 A1* | 8/2004 | Wilk | ..................... | H01G 9/008 361/42 |
| 2004/0246635 A1* | 12/2004 | Morita | ................. | H02J 7/0018 361/1 |

(Continued)

FOREIGN PATENT DOCUMENTS

| | | |
|---|---|---|
| CN | 107946081 A | 4/2018 |
| DE | 10-2011-009474 A1 | 7/2012 |

OTHER PUBLICATIONS

International Search Report and Written Opinion in International Appln. No. PCT/IB2025/053162, mailed on Jul. 1, 2025, 20 pages.

*Primary Examiner* — Yalkew Fantu
(74) *Attorney, Agent, or Firm* — Fish & Richardson P.C.

(57) ABSTRACT

The present disclosure provides an energy storage system, device, and method of operating thereof. The device includes multiple capacitor cells, e.g., encapsulated capacitor cells, connected in series. A MOSFET-based, cross-point switch can be connected to the individual capacitor cells to manage balancing. Sensors can monitor the individual capacitor cells and provide data to a processor that determines instructions for the array of switches and individual capacitor cells. The capacitor cells can include capacitors based on solid-state dielectrics. A method of charge balancing, e.g., charge balancing with the energy storage device or system, can include sending instruction to a digital control port embedded within each capacitor cell.

19 Claims, 6 Drawing Sheets

(56)          References Cited

U.S. PATENT DOCUMENTS

| | | | |
|---|---|---|---|
| 2005/0007799 A1* | 1/2005 | Schreiber | H02M 5/458 |
| | | | 363/132 |
| 2008/0094042 A1* | 4/2008 | Ferrario | H02J 7/00 |
| | | | 323/234 |
| 2013/0062946 A1 | 3/2013 | Ferber, Jr. | |
| 2018/0076644 A1* | 3/2018 | Qureshi | H02J 7/0069 |
| 2018/0375345 A1* | 12/2018 | Altemose | H02J 7/0048 |
| 2020/0153262 A1 | 5/2020 | Yoon | |
| 2022/0077508 A1 | 3/2022 | Nayar et al. | |

* cited by examiner

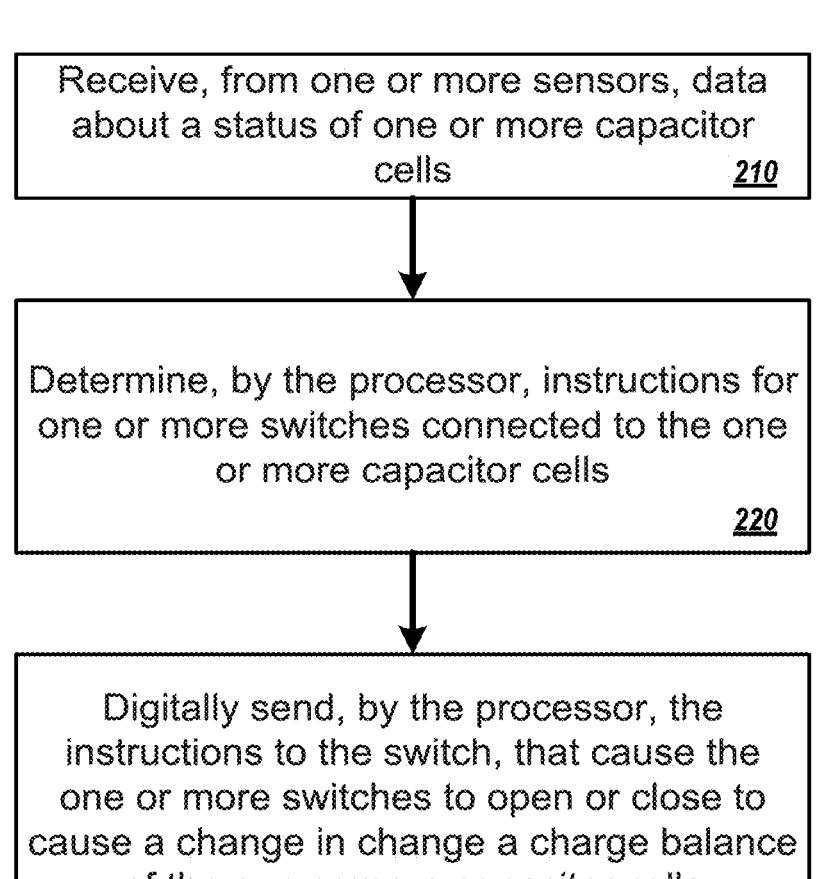

200

Receive, from one or more sensors, data about a status of one or more capacitor cells          _210_

Determine, by the processor, instructions for one or more switches connected to the one or more capacitor cells

_220_

Digitally send, by the processor, the instructions to the switch, that cause the one or more switches to open or close to cause a change in change a charge balance of the one or more capacitor cells          _230_

FIG. 2A

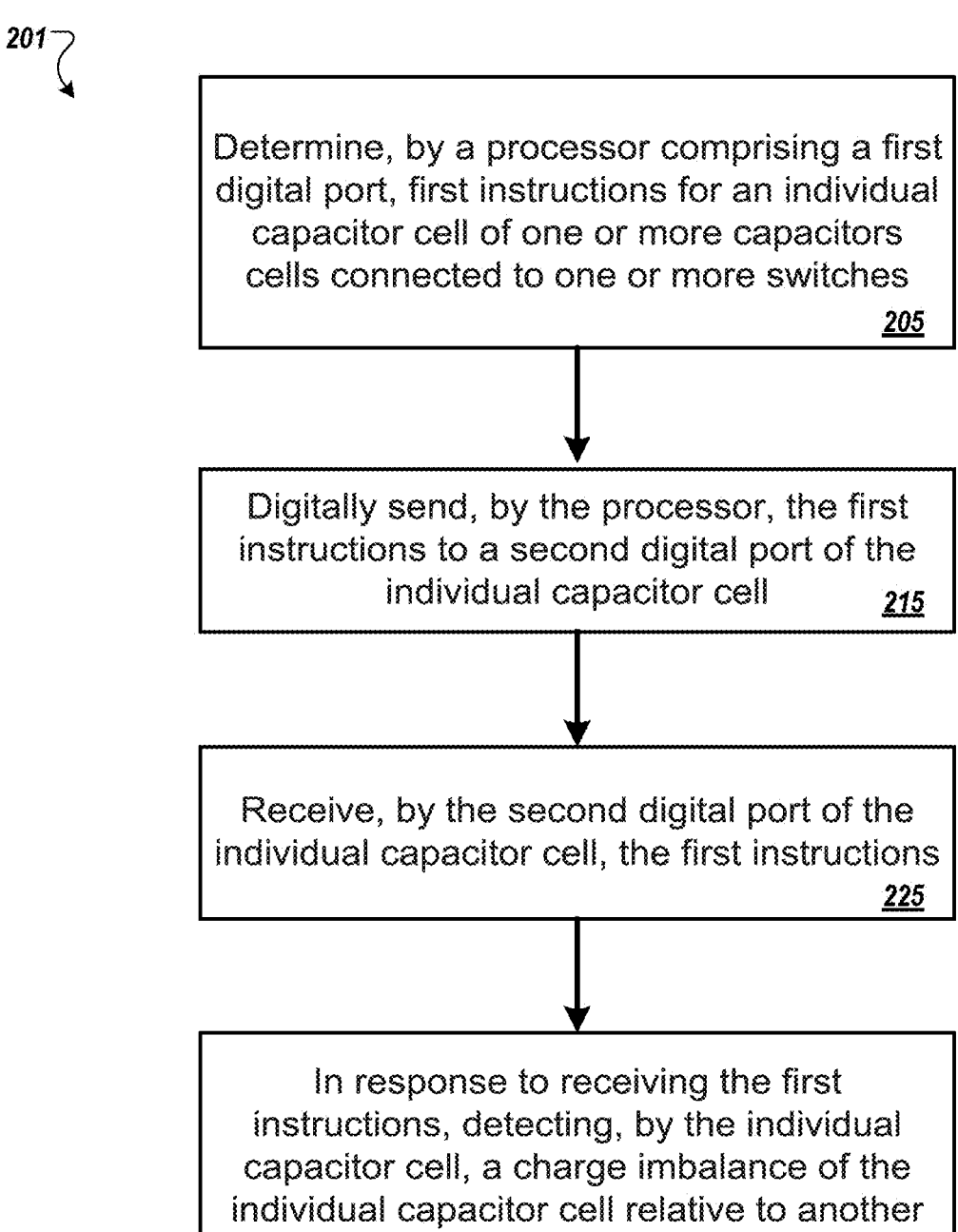

201

Determine, by a processor comprising a first digital port, first instructions for an individual capacitor cell of one or more capacitors cells connected to one or more switches <u>205</u>

Digitally send, by the processor, the first instructions to a second digital port of the individual capacitor cell          <u>215</u>

Receive, by the second digital port of the individual capacitor cell, the first instructions <u>225</u>

In response to receiving the first instructions, detecting, by the individual capacitor cell, a charge imbalance of the individual capacitor cell relative to another capacitor cell of the one or more capacitor cells          <u>235</u>

FIG. 2B

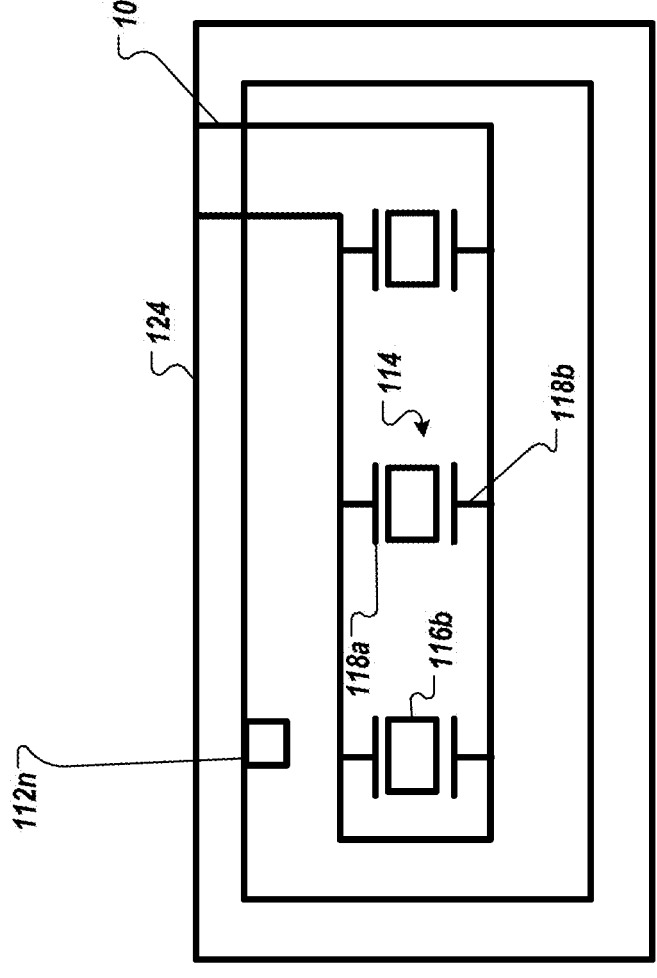
FIG. 3B

CAPACITOR CELL BASED ENERGY STORAGE SYSTEM WITH ARRAY OF SWITCHES

CLAIM OF PRIORITY

This application is a utility application which claims benefit to U.S. Provisional Application Ser. No. 63/570,171, filed on Mar. 26, 2024, 63/570,163, Filed Mar. 26, 2024, 63/570,150 filed Mar. 26, 2024, and 63/570,131 filed Mar. 26, 2024, the entire contents of which are hereby incorporated by reference.

BACKGROUND

Energy storage devices are an important component of renewable energy solutions, allowing energy to be stored for later use. Some energy storage devices utilize multiple capacitors that can be charged and discharged.

In general, charge and discharge currents between capacitor cells with high energy densities, e.g., 460 Watt-hours/ kilogram, can be difficult to balance. For example, imbalances in charge between conventional supercapacitor cells can develop over the course of tens of minutes.

SUMMARY

The present disclosure provides an energy storage system or device including multiple capacitor cells, e.g., encapsulated capacitor cells, connected in series. A MOSFET-based, cross-point switch can be connected to the individual capacitor cells to manage balancing. Sensors can monitor the individual capacitor cells and provide data to a processor that determines instructions for the array of switches and individual capacitor cells. The capacitor cells can include capacitors based on solid-state dielectrics.

A method of charge balancing, e.g., charge balancing with the energy storage device or system, can include sending instruction to a digital control port embedded within each capacitor cell, e.g., an encapsulated capacitor cell. The instructions can be based upon data received from sensors monitoring the capacitor cells. A processor communicates with each encapsulated capacitor cell through a digital port, which can receive data about voltage, current, temperature, and the electric field of each connected capacitor cell and send instructions based on the received data. Through various methods of balancing, e.g., active and passive, the processor can cause the encapsulated capacitor cells to charge balance at high speeds, e.g., less than 1 ms, and with high accuracy, on the order of 0.1 millivolt.

A capacitor cell, e.g., a capacitor cell from the energy storage system, can be encapsulated and digitally controlled. The digital control of the encapsulated capacitor cells can be individualized, allowing for highly reliable, safe, and accurate charge balancing. Multiple capacitors connected in parallel and encapsulated within a housing can form a single encapsulated capacitor cell, which can be used as an energy storage device.

The encapsulated capacitor cells can include solid-state capacitors, which can provide longer lifespans and higher tolerances for high temperatures at high frequencies compared to electrolyte capacitor cells.

In some implementations, one or more of the above implementations can be combined. For example, an energy storage system can employ the method of charge balancing.

As another example, the energy storage system can include the encapsulated capacitor cells, which can include solid-state capacitors.

The subject matter described in this specification can be implemented in various implementations and may result in one or more of the following advantages. In some implementations, using the described encapsulated capacitor cell can reduce manufacturing costs, increase the lifespan of the cell, reduce the charging time of the cell, lower the environmental footprint of creating high-energy density storage devices, or a combination thereof. For example, preventing charge or discharge currents from exceeding a threshold value can prevent the deterioration of individual capacitor cells.

In some implementations, an individual encapsulated capacitor cell can be removed from an energy storage system without adversely affecting the rest of the energy storage system. In some implementations, the removed individual encapsulated capacitor cell can operator on its own or be coupled to other energy storage units.

In some implementations, the energy storage devices having balanced and stable calibration allows them to be used in various applications, such as artificial intelligence, batteries for electric vehicles, cell phone towers, wireless charging, industrial drive systems, and different automation controllers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A and 2B are flow diagrams of processes illustrating examples of charge balancing.

FIG. 3B is a diagram of an example of an encapsulated capacitor cell including solid-state capacitors.

Like reference numbers and designations in the various drawings indicate like elements.

DETAILED DESCRIPTION

Capacitor Cell Based Energy Storage System

Figure 1A:
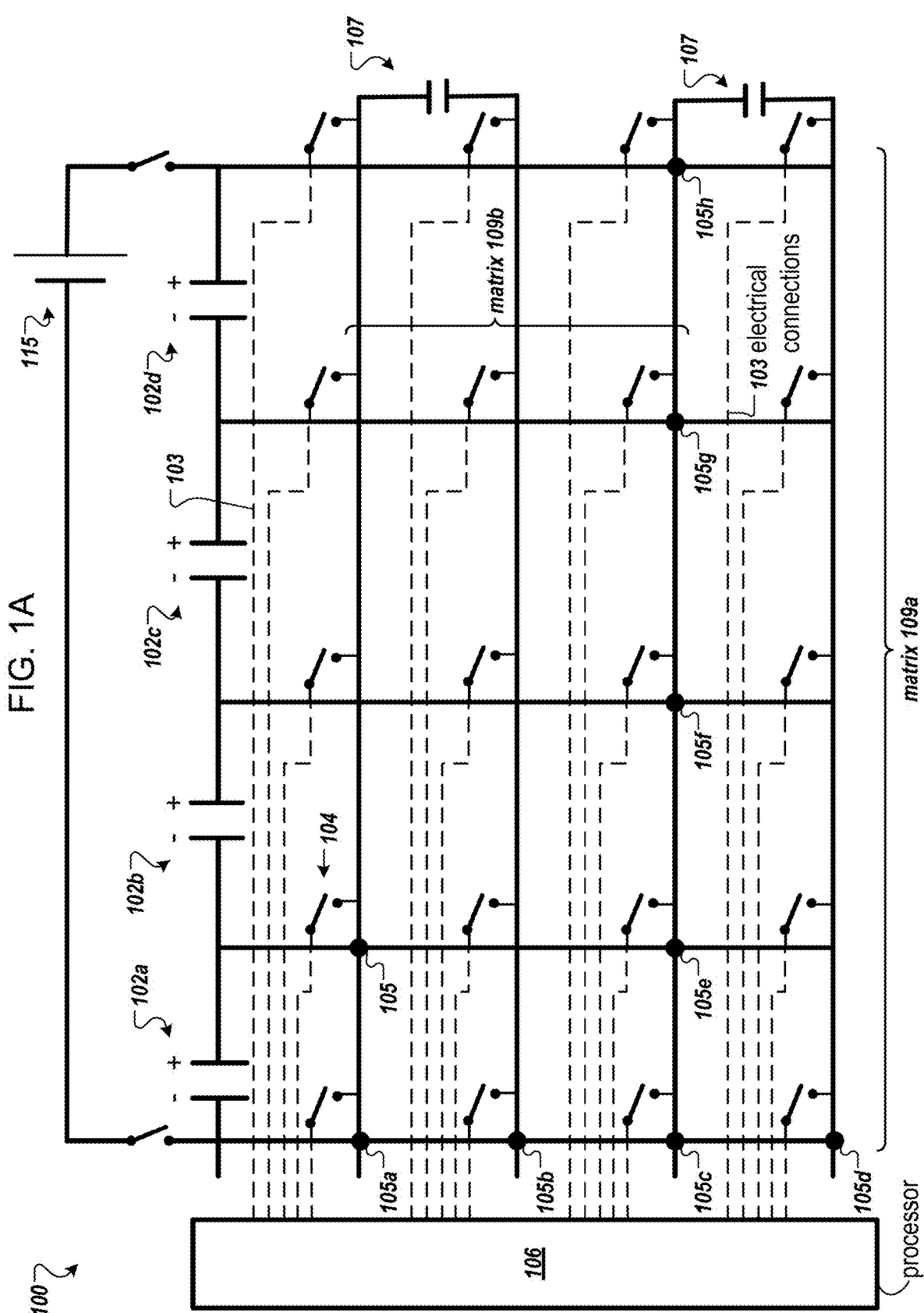
FIG. 1A is a diagram of an example of an energy storage system.

FIG. 1A is a diagram of an example of an energy storage system 100. The depiction of the energy storage system 100 is truncated for convenience, and each of the circuit lines can connect to non-illustrated components depending on the implementation.

The energy storage system 100 can include multiple capacitor cells 102a, 102b, 102c, and 102d, a switch array including switches 104, a processor 106, e.g., a microcontroller, and electrical connections 103 (indicated by the dashed lines), which connect the processor 106 to each individual switch 104. In some implementations, the capacitor cells 102a, 102b, 102c, and 102d are encapsulated capacitor cells.

In FIG. 1A, the switches 104 are arranged in a matrix 109a, e.g., each of the capacitor cells 102a, 102b, 102c, and 102d are connected in parallel to multiple switches 104. For example, for an energy storage system having four capacitor cells, there are 16 (4×4) switches arranged in a grid in parallel with the capacitor cells connected in series. In such examples, there are fewer capacitor cells than there are switches. Each capacitor cell 102 is connected to a circuit having parallel loops, each of which can be opened by the opening of the switch. Accordingly, how charge can flow between two capacitor cells depends on the state of the switches in the switch array. In some implementations, the processor 106 is configured to determine instructions for the switch array that change the structure of the circuit, e.g., different groups of capacitor cells 102a, 102b, 102c, and 102d being in parallel or series, to create a circuit with a target capacitance and thus target voltage.

Generally, the capacitor cells 102a, 102b, 102c, and 102d are charged by being connected to a potential source 115. As current flows from the potential source through each capacitor cell 102a, 102b, 102c, and 102d, charge distributions with opposite polarity accumulate on opposite surfaces, e.g., an anode and a cathode, of each capacitor cells 102a, 102b, 102c, and 102d. Whether a capacitor is charging or discharging depends on the direction of current flow across the positively and negatively charged sides of the capacitor. Once electrical energy has accumulated in an individual encapsulated capacitor cell, the capacitor cell can continue to store the energy even when disconnected from the potential source, which allows the capacitor cell to store energy. The presence of a dielectric material between the anode and cathode decreases the electric field and increases the capacitance of the capacitor.

Each capacitor cell 102 in the energy storage system 100 can be, through the switch array, disconnected or connected to other capacitor cells to control the flow of current between the capacitor cells. For example, when all of the switches 104 in the switch array are closed, e.g., in a closed state, current can flow from any one capacitor cell, e.g., an encapsulated capacitor cell, to another. However, when a switch 104 opens, current cannot flow through the opened switch.

The array of switches 104 are connected by circuit lines, which meet at nodes 105. Nodes 105 indicate positions where the current can split or change direction, e.g., a junction. Nodes 105 form a matrix 109b within energy storage system 100, e.g., for four capacitor cells 102a, 102b, 102c, and 102d, there are four by four nodes, four nodes being below each capacitor cell 102. For example, nodes 105a, 105b, 105c, and 105d are located below capacitor cell 102a. Each node is in a row of four nodes forming a bus. For example, nodes 105c, 105e, 105f, and 105g are in the third row of the matrix. In this example, the third row of the matrix has an additional node 105h, which marks a junction where the current can flow toward floating capacitor 107. Additionally, each switch 104 has a pair of ends, each of which includes a node.

A row or column of nodes 105 can form a bus, which connects to various other paths of circuit lines. Individual nodes 105 are located in portions of the circuit that are parallel to the circuit branches including the switches 104. For example, the array of switches 104 form a first matrix, and a portion of the nodes 105 form a second matrix. When switch 104a is closed, the circuit portion including node 105 in the second matrix is in parallel to the circuit portion including switch 104a. When switch 104a is open, the portion of the circuit including switch 104a does not include a functioning circuit element, so that portion of the circuit element and node 105 can effectively collapse to a single node.

The processor 106 can control the array of switches 104, e.g., a crossbar switch, to have various configurations, e.g., combinations of certain switches being open while other switches are closed, thereby allowing and preventing current flow between the capacitor cells 102a, 102b, 102c, and 102d. Current will not flow in an open circuit, so the processor 106 determines instructions for closing the switches such that a closed path is still formed while a capacitor cell is disconnected. In a closed circuit, current generally flows from high to low potentials. By controlling the array of switches 104 to open and close, the path of the current in the energy storage system 100 will change, thereby allowing targeted control of charge flow to unbalanced capacitor cells 102. In some implementations, the rate of charge flow can be relatively fast, e.g., 2.4 Coulombs/nanosecond or more.

In some implementations, one or more of the switches is based on a metal-oxide-semiconductor field-effect transistor (MOSFET). In a MOSFET-based switch, whether current does or does not flow between the source and drain of the MOSFET depends on the applied gate voltage. When there is a drain-source current, the switch is closed, and when there is not drain-source current, the switch is open.

As an example, when the switches 104 are MOSFET-based, a closed switch 104 only allows current flow in one direction. In general, charge in the energy storage system 100 flows from high to low potentials. As a result, opening a switch 104 can prevent charge flowing between any two of capacitor cells 102a, 102b, 102c, and 102d. For example, when switch 104a is open, capacitor cell 102b cannot charge capacitor cell 102a, since charge cannot flow from positive end of capacitor cell 102b to the positive end of capacitor cell 102a. The MOSFET-based switches have a nonzero impedance, such as 10 Ohms or less, e.g., 5 Ohms.

The processor 106 can also control the array of switches 104 to connect or disconnect floating capacitors 107, which are connected to the rest of the energy storage system 100 through switches 104.

Figure 1B:
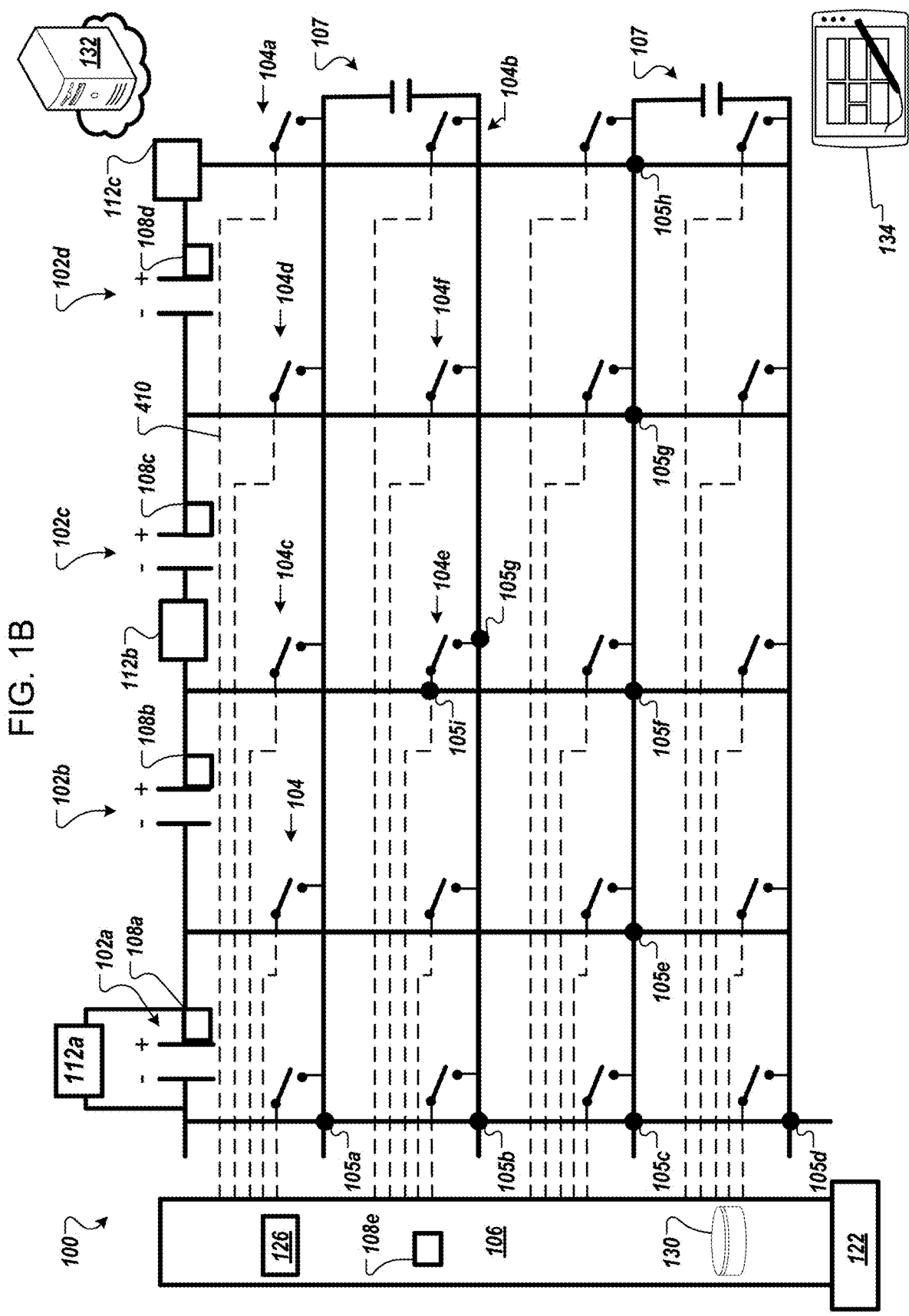
FIG. 1B is a diagram of the energy storage system of FIG. 1A with more detail.

FIG. 1B is a diagram of the energy storage system 100 of FIG. 1A in more detail. For example, additional switches 104 are illustrated. Each switch 104 includes two nodes 105. One node, e.g., node 105i, of a switch 104, e.g., switch 104e, is connected to a negative terminal in one direction, e.g., toward the processor 106, and to another node, e.g., node 105g, that is in the row of other switches, e.g., switch 104f, in the row of the switch 104e.

When analyzing circuits, a portion of a circuit that contains two or more nodes 105 and no other circuit elements, e.g., a two-terminal circuit element, such as switches 104, can be collapsed to a single node. Accordingly, when the switches 104 are opened, the circuit in energy storage system 100 can generally be simplified, and branches including open switches are no longer in parallel with other branches of the circuit.

In some implementations, the processor 106 includes a controller area network bus (CANBUS) communication controller 126 for two-way communication between the processor 106 and an individual capacitor cell 102. In general, various suitable communication means such as buses, wires, and other types of electrodes can be used to facilitate communication between the processor 106 and one or more of the capacitor cells 102a, 102b, 102c, and 102d.

Multiple sensors 112a, 112b, and 112c can monitor the status of one or more of the capacitor cells 102a, 102b, 102c, and 102d. For example, sensor 112a can be a voltmeter connected in parallel to capacitor cell 102a and measuring the potential of capacitor cell 102a. Sensor 112b can be an ammeter connected in series between capacitor cells 102*b* and 102*c* and measuring the current flowing between capacitor cells 102*b* and 102*c*. Sensor 112*c* can be a Hall effect sensor connected in series to both capacitor cell 102*d* and the ground and measuring the magnetic field associated with encapsulated capacitor cell 102*d*, or a combination thereof. In general, various suitable sensors (e.g., temperature sensor, an ohmmeter, an ammeter) can be used as one or more of sensors 112*a*, 112*b*, and 112*c*. The processor 106 controls the sensors 112, and sensors 112 collect data about the status of the capacitor cells 102*a*, 102*b*, and 102*c* and send the data to the processor 106 using one or more suitable communication protocols.

In general, balancing the capacitor cells 102*a*, 102*b*, 102*c*, and 102*d* involves equalizing the potential difference across and the state of charge (SoC) in each capacitor cells 102*a*, 102*b*, 102*c*, and 102*d*. SoC is the level of charge of the overall energy storage system 100, e.g., a percentage of charge stored based on the charge capacity. Balancing prevents overcharging or undercharging the capacitor cells 102*a*, 102*b*, 102*c*, and 102*d*, which can cause damage, thereby reducing capacity and shortening the lifespan of encapsulated capacitor cells 102*a*, 102*b*, 102*c*, and 102*d*.

In some implementations, an individual switch 104 can have a nonzero impedance, thereby providing some resistance, e.g., on the order of one Ohm. Consequently, a switch 104 can behave like a dumping resistor, which is useful for top balancing. Given a fixed voltage difference, the lower the resistance is, the higher the current is. Therefore, the switch array behaving like an array of dumping resistors can encourage higher currents and facilitate quick energy discharge.

Floating capacitors 107*a* and 107*b* are connected to the capacitor cells 102*a*, 102*b*, 102*c*, and 102*d* in a series string for active balancing. The series string includes switches 104*a* and 104*b* that can, depending on the state of each switch, determine whether one or more of the capacitor cells 102*a*, 102*b*, 102*c*, and 102*d* are connected to floating capacitor 107 in series. For example, when both of the switches 104*a* and 104*b* are closed and depending on the state of the other switches in the array, the floating capacitor 107*a* is connected in parallel with at least two of the capacitor cells. When a pair of encapsulated capacitor cells with different SoCs are connected in series with each other and floating capacitor 107, charge from the relatively overcharged encapsulated capacitor cell will flow to the relatively undercharged encapsulated capacitor cell.

As an example, if encapsulated capacitor cell 102*b* has a greater potential difference than capacitor cell 102*c*, the processor 106 can determine instructions to cause switches 104*a*, 104*b*, 104*c*, 104*d*, 104*e*, and 104*f* to be closed while the remaining switches are open, thereby forming a closed loop including encapsulated capacitor cells 102*b* and 102*c* and floating capacitor 107. In some implementations, if there are N capacitor cells, there are N+1 switches in the series string.

The present example depicts four capacitor cells 102 in series, but other numbers are possible. For example, the energy storage system 100 can include 4 to 32 capacitor cells, e.g., encapsulated capacitor cells, depending upon the voltage and capacitance of the capacitor cells. In some implementation, the energy storage system 100 includes a voltage source, e.g., a direct-current (DC) voltage source.
Electronic Control of the Encapsulated Capacitor Cell Based Energy Storage System The processor 106 can include control circuitry configured to execute instructions of a program that controls operation of a control unit system. In these examples, the processor 106 may be configured to receive input from sensors 112 or other devices included in the control unit system and control operations of devices included in the energy storage system 100. For example, the processor 106 may be configured to control operation of a network module included in the control unit system. In some implementations, the processor 106 includes computational resources to calculate control parameters based on the input from sensors 112.

In some implementations, the processor 106 includes a transceiver including a transmitter and a receiver. The transceiver may be utilized to communicate with other devices. The transceiver may include amplifiers, modulators, demodulators, antennas, and various other components. The transceiver may communicate with devices, device cloud databases, and other networks. The transceiver may direct data received from other devices to other components of the server 132. The transceiver may also direct data received from components of the server 132 to other devices. The processor 106 may be coupled to all components of the server 132 and may control the operations of the server 132. The processor 106 may include various logic circuitry and programs to execute the various implementations described herein.

In some implementations, the processor 106 may include neural network classifiers to classify one or more patterns in vehicle setting data collected from one or more vehicles and drivers. In general, the neural networks may be trained to classify various suitable patterns including, for example, patterns indicative of setting values associated with patterns indicative of system setting values associated with a particular location and application requirements.

The processor 106 can control various functions of a capacitor cell to configure the operation or state of the capacitor cell. For example, the processor 106 can determine instructions for components within the energy storage system 100 to maintain charge balance, e.g., control charge and discharge currents, between the capacitor cells 102*a*, 102*b*, 102*c*, and 102*d*. For example, using the data collected by sensors 112*a*, 112*b*, and 112*c*, the processor 106 can detect the presence of a charge imbalance and send instructions to each of the capacitor cells 102*a*, 102*b*, 102*c*, and 102*d*.

In some implementations, the processor 106 can include storage 130 or any other computer-readable storage medium that incudes operating instructions. For example, the processor 106 can periodically send instructions to the capacitor cells 102*a*, 102*b*, 102*c*, and 102*d*. The storage 130 can store data collected by the sensors and regularly refresh values stored for each encapsulated capacitor cell, e.g., once per second. In some implementations, the storage 130 includes a secure digital (SD) card.

Storage 130 may include one or more mass storage devices, e.g., magnetic, magneto optical disks, optical disks, EPROM, EEPROM, flash memory devices, and may be implemented as internal hard disks, removable disks, magneto optical disks, CD ROM, or DVD-ROM disks for storing data. The storage 130 may store rules for training neural networks and rules received from drivers for processing vehicle setting data respectively received from the drivers.

In some implementations, the configuration of the energy storage system 100 allows for a high energy density, e.g., 100 Wh/kg to 250 Wh/kg, while still maintaining a charge balance within a threshold. For example, the energy density of the individual encapsulated capacitor cells 102*a*-102*c* can be between 250 Wh/kg and 460 Wh/kg.

In general, each of the capacitor cells 102a, 102b, 102c, and 102d can have respective ports that are used to connect to other modules, e.g., circuitry in energy storage system 100. Advantageously, each capacitor cell having a port enables the capacitor cell to be easily removed from a circuit, replace another component in a circuit, and generally be incorporated into other systems. In some implementations, the port is a digital port.

Each of the capacitor cells 102a, 102b, 102c, and 102d can have a respective digital port 108a, 108b, 108c, and 108d that allows communication with the processor 106. The digital ports 108a-d allow communication between the capacitor cells 102, which generate analog signals within each cell, and the processor 106, which sends and receives digital signals. In some implementations, the digital ports 108a-d utilize pulse width modulation (PWM), where the incoming signal, e.g., a constant current or voltage, is passed through a low-pass analog filter. In some implementations, the digital ports 108 utilize pulse density conversion, oversampling, binary-weighting, or a combination thereof to convert the incoming digital signals to analog signals for use in the capacitor cells 102.

The digital ports 108a, 108b, 108c, and 108d can include a controller area network bus (CANBUS) protocol. Each of the capacitor cells 102a, 102b, 102c, and 102d having a respective digital port 108a, 108b, 108c, and 108d allows for a high degree of control and monitoring of the individual capacitor cells 102a, 102b, 102c, and 102d, compared to if the array of capacitor cells had a single port for monitoring and receiving instructions.

Each of the capacitor cells 102a, 102b, 102c, and 102d include a respective digital port 108a, 108b, 108c, and 108d configured to receive digital signals, e.g., a signal composed of discrete values. Advantageously, through digital ports 108a, 108b, 108c, and 108d, each of the capacitor cells 102a, 102b, 102c, and 102d can be connected to a digital port 108e of the processor 106 without use of inverters, charge converters, or rectifiers, e.g., the digital port does not include an inverter, a converter, or a rectifier. Consequently, there is no need to convert direct current (DC) to alternating current (AC) with an inverter, convert AC to DC with a converter, or modify the AC to DC converted signal with a rectifier, all of which can lead to power loss.

Digital control enables real time updates to target parameters, e.g., a charge or change transfer rate, by the processor 106 of individual capacitor cells 102. In contrast, analog control generally requires replacement of hardware, e.g., physical components of the energy storage system 100.

The processor 106 can be connected to a CANBUS port 122 to communicate with external devices. In some implementations, the processor 106 can include two or more CANBUS ports to communicate with other modules connected in series or in parallel combinations to the energy storage system 100.

The processor 106 can be connected to a controller for a wired or wireless communication system to communicate with a cloud-based central server 132 to allow for cloud-based monitoring of the energy storage system 100. The processor 106 can be connected through various protocols to a controller communicating with a user device, such as a computer, tablet, or mobile phone.

For example, the processor 106 can be connected through one or more networks that are configured to provide network access, data transport, and other services to any interface connected to the one or more networks. In general, the one or more networks may include and implement commonly-defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include access points, storage systems, cloud systems, modules, one or more databases including vehicle cloud database, and servers including one or more network servers, e.g., server 132. The one or more network servers 132 may include any suitable computing device coupled to the one or more networks, including but not limited to a personal computer, a server computer, a series of server computers, a mini computer, and a mainframe computer, or combinations thereof. The one or more network servers may also include a web server, or a series of servers, running a network operating system, examples of which may include but are not limited to Microsoft® Windows® Server, Novell® NetWare®, or Linux®. The one or more network servers may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, the one or more network servers may send and receive data using any technique for sending and receiving information including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

In some implementations, the one or more networks may include a cloud system that may provide internet connectivity and other network-related functions. For example, the cloud system may provide storage services for at least a portion of the data transmitted between components of system 100.

In some implementations, the processor 106 can have an onboard Bluetooth communication controller to communicate with external Bluetooth devices. In general, the processor 106 can be embedded with a serial port to use various types of communication protocols.

In some implementations, the processor 106 is connected to a human machine interface (HMI) panel 134, e.g., a touch panel. The HMI interface 134 can allow users to change settings, e.g., service set identifier (SSID), Wi-Fi, Bluetooth, dry contact, and real-time communication (RTC) settings. The HMI interface 134 can display graphs for voltage, current, temperature, cell status for anode, cathode and envelope, battery voltage, battery current, battery temperature, maximum, minimum and differential voltages, a temperature status for a terminal and cell, Wi-Fi and Bluetooth connectivity status, charge, discharge and equalization status, RTC status, and whether alarm conditions are detected.

The HMI panel 134 can include a display unit, input unit, and one or more sensors. The sensors may include an optical sensor, capacitive sensor, charge-coupled device sensor, gyroscope, microphone, altimeter, impact sensor, piezoelectric sensor, motion sensor, biosensor, active pixel sensor, and various other sensors that may detect one or more conditions or receive inputs. The input unit may include various devices that are configured to receive one or more inputs. For example, the input unit may include a mouse, touch pad, or keyboard for receiving alphanumeric text.

The display unit in the user interface may display various data. The display unit may be implemented through suitable displays including, for example, a projection display, a liquid crystal display (LCD), or light emitting diode (LED) display. In some implementations, the display unit, input unit, and one or more sensors may be combined into a single integrated component, and, in some implementations, the display unit, input unit, and one or more sensors may be multiple components.

FIG. 2A is a flow diagram of a process 200 for charge balancing. For example, the energy storage system 100 can perform the process 200.

The processor 106 can receive, from one or more sensors, e.g., sensors 112a-112c, data about a status of one or more capacitor cells, e.g., capacitor cells 102a-102d (210). In some implementations, the data includes a temperature, a voltage, current, the electric field of at least a portion of the one or more capacitor cells, or combination thereof.

In response to receiving the data, the processor 106 can determine instructions for one or more switches connected to the one or more capacitor cells (220). In some implementations, the one or more switches includes two types of MOSFET based arrays, e.g., including n-type or p-type semiconductor components or a combination thereof.

In some implementations, the instructions comprise instructions for active switching, e.g., causing charge to flow from one encapsulated capacitor cell to another.

In some implementations, the instructions comprise instructions for passive switching. For example, the processor 106 can be connected to a relay board, which can switch relays of a dry contact, e.g., a potential-free contact. Passive switching can be used when an alarm condition has been met, e.g., a particular encapsulated capacitor cell has overheated. Depending on whether the dry contact is open or closed, current will flow or not flow, respectively.

The processor 106 digitally sends the instructions to the one or more switches that cause the one or more switches to open or close to cause a change in a charge balance state of the one or more capacitor cells (230).

In some implementations, the process 200 can include additional steps, fewer steps, or some of the steps can be divided into multiple steps. For example, in some implementations, step 210 does not occur, and the processor determines instructions for the one or more switches without data collected by the sensors.

In some implementations, the process 200 includes determining instructions for an individual capacitor cell 102, sending digital instructions to the individual capacitor cell 102, or both. Instructions for the individual capacitor cells 102 can include instructions to collect data using sensors within the capacitor cell, send data to the processor or another capacitor cell, or both. For example, the instructions can cause a sensor of an individual capacitor cell to determine a charge state of the capacitor cell and compare this charge state to that of another capacitor cell. In some cases, the instructions to collect sensor data include reference data to compare against the collected data. Using data received from the capacitor cells, the processor can determine additional instructions for controlling the switch matrix. For example, if a capacitor cell is overcharged compared to the remaining capacitor cells, the instructions can cause switches to open or close in order to cause charge to flow from the overcharged capacitor cell.

As an example, the sensors can collect data about the temperature of the encapsulated capacitor cells, and the instructions compensate for differences in temperature between different capacitor cells 102 by causing charge to flow from an overheated capacitor cell to another encapsulated capacitor cells. In the manner, properties (e.g., temperature) other than the charge of a capacitor cell can also be controlled. For example, flowing charge into an encapsulated capacitor cell can increase a temperature of the encapsulated capacitor cell, and flowing charge out of an encapsulated capacitor cell can decrease a temperature of the encapsulated capacitor cell.

As an example, an energy storage system 100 can perform a bypass operation. In this example, the energy storage system 100 includes 22 encapsulated capacitor cells in series, two of which are redundant. If a particular encapsulated capacitor cell of the 20 non-redundant capacitor cells becomes faulty, the processor 106 can determine instructions to disconnect the faulty capacitor cell and bring one of the redundant capacitor cells up to an appropriate charge and then reconnect the redundant capacitor to the remaining non-redundant encapsulated capacitor cells. In general, any suitable number of redundant capacitor cells can be included in a system 100.

In some implementations, the instructions comprise instructions for top balancing. Generally, top balancing refers to determining the potential difference across each of capacitor cells 102a-102d, identifying which of capacitor cells 102a-102d has the highest potential difference, and then equalizing the capacitor cells 102a-102d such that all of capacitor cells 102a-102d have the same potential difference equal to the highest potential difference. For example, while charging, the processor 106 can receive data from sensors 112 to determine the voltage of each of capacitor cells 102a-102d. The instructions can include changing states of switches with a threshold resistance, such that the switches behave like dumping resistors and a potential source is connected to the capacitor cells 102a-102d. The instructions can also include setting a potential of the potential source to be substantially equal to the highest potential difference between capacitor cells. Then the processor 106 can monitor the potential differences of each of the capacitor cells 102a-102d until each potential difference is substantially equal to the highest potential difference. The instructions can include disconnecting the potential source and opening the switches behaving like dumping resistors, thereby disconnecting from particular capacitor cells.

As another example, top balancing while discharging includes setting a potential of a potential source to be substantially equal to the lowest potential difference and determining instructions for the switch array to cause capacitor cells with voltages greater than the lowest potential difference to discharge until the encapsulated capacitor cells have a voltage substantially equal to the lowest potential difference.

In some implementations, the instructions comprise instructions for active balancing, e.g., moving energy from a relatively overcharged encapsulated capacitor cell to a relatively undercharged capacitor cell. For example, the instructions can include determining the potential difference across each of capacitor cells 102a-102d and identifying which pair of capacitor cells have the greatest potential difference. The instructions can include changing states of switches 104fe-h such that the floating capacitor 107 and the identified pair of capacitor cells are connected. Then the processor 106 can monitor the potential differences of each of the capacitor cells in the pair until each potential difference is substantially equal. The instructions can include disconnecting the floating capacitor 107 from the pair of capacitor cells by changing a state of the switches 104.

In some implementations, the instructions comprise instructions for passive balancing, e.g., removing excess energy from a relatively overcharged capacitor cell through a resistive element until the SoC matches that of a relatively undercharged capacitor cell.

In some implementations, the charge balancing can occur very quickly and accurately, e.g., at the speed of 1 ms and accuracy of 0.1 millivolts.

In some implementations, the instructions comprise instructions for addressing overcurrent. For example, if charging the capacitor cells 102a, 102b, 102c, and 102d with the potential source is unexpectedly interrupted but a discharge current in the energy storage system 100 is not interrupted, the current through a particular element of the energy storage system 100 can exceed a safe value. The processor 106 can detect overcurrent by monitoring the current through various points in the energy storage system 100. The instructions can include opening a switch to stop overcurrent from flowing through a particular element of the energy storage system 100.

In some implementations, the process 200 can include additional steps, fewer steps, or some of the steps can be divided into multiple steps. For example, the processor 106 can be programmed with instructions that occur on a scheduled or periodic basis regardless of whether data about the status of the one or more of encapsulated capacitor cells has been received. In this case, step 210 can be omitted and step 220 can occur not in response to step 210.

In some implementations, the instructions can be received by the transceiver in the processor 106. For example, an antenna can receive a signal from a device external to energy storage system 100 with instructions.

In some implementations, the instructions can be received by the HMI interface 134. For example, user input received through a user interface can determine control parameters for the instructions in the method of charge balancing. The instructions can include instructions that cause the HMI interface 134 to visually display information, e.g., graphs and charts, about the status of components of the energy storage system 100 for a user.

In some implementations, the instructions can include causing the processor 106 to run a machine learning algorithm to determine optimized parameters, e.g., how often to process sensor data or a voltage difference for each capacitor cell.

FIG. 2B is a flow diagram of a process 201 of digitally controlling a capacitor. For example, the process 201 can be performed by the processor 106 and one of the capacitor cells, e.g., capacitor cell 102a.

The processor 106 determines first instructions for an individual capacitor cell of one or more capacitors cells connected to one or more switches (205). The processor 106 can include a digital port, e.g., digital port 108e, that communicates with a digital port on the individual capacitor cell, e.g., digital port 108a of capacitor cell 102a.

The processor 106 digitally sends the first instructions to a second digital port, e.g., digital port 108a, of the individual capacitor cell (215).

The second digital port receives the first instructions (225). This communication can use, for example, CANBUS, Bluetooth, or Wifi connection.

In response to receiving the first instructions, the individual capacitor cell detects a charge imbalance of the individual capacitor cell relative to another capacitor cell of the one or more capacitor cells (235). Detecting the charge imbalance can include collecting sensor data and comparing this data to a reference value. For example, the first instructions can instruct a sensor of the individual capacitor cell to collect data indicating a status of the individual capacitor cell. The individual capacitor cell can compare this data to reference data, e.g., data indicating the status of the other capacitor cell. Then the individual capacitor cell can detect the charge imbalance based on the comparison of the data reflecting the status of the two capacitor cells. In some implementations, the instructions can include this reference, and the individual capacitor cell identifies the reference data within the first instructions.

In some implementations, the instructions cause a change in a charge balance of the individual capacitor cell relative to the one or more capacitor cells. The digital port can convert the digital instructions to an analog signal that, when fed to the capacitor cell, result in a change in charge, current, voltage, or a combination thereof. For example, the instructions to cause charge to flow out of the individual capacitor cell and into a different capacitor cell.

In some implementations, the process 201 can include additional steps, fewer steps, or some of the steps can be divided into multiple steps. For example, the process 201 can include any of the steps from process 200.

In some implementations, the process includes, before determining the first instructions, receiving, from one or more sensors, data indicative of a status of the one or more capacitor cells. This data can reflect charge statuses, temperatures, potential differences, and so on of each of the capacitor cells, e.g., the data can include one or more of a temperature measurement, a voltage measurement, a current measurement, and an electric field value corresponding to at least a portion of the one or more capacitor cells. The processor can use this data to determine the first instructions for the individual capacitor cell.

In some implementations, a method of charge balancing, e.g., like method 200, follows method 201. For example, method 201 can further include determining, by the processor and in response to detecting the charge imbalance, second instructions for the one or more switches. Then, the processor can send the second instructions to the one or more switches.

In response to receiving the second instructions, at least a portion of the one or more switches can change their respective switch state using the second instructions. For example, this can include opening or closing a portion of the switches, while the remaining switches maintain their switch state. Opening or closing a portion of the switches can lead to various outcomes, e.g., (dis)connecting capacitor cells in parallel from/to a resistor, (dis)connecting capacitor cells from/to a floating capacitor, and allowing charge flow between some capacitor cells while preventing charge flow to the remaining capacitor cells.

In some implementations, the process includes receiving, from a human-machine-interface (HMI) connected to the processor, input for controlling the one or more capacitor cells. Then the processor can use the input to determine the first instructions, e.g., the input indicates that the individual capacitor cell should check for a charge imbalance based on temperature sensor data.

Individual Encapsulated Capacitor Cells

Figure 3A:
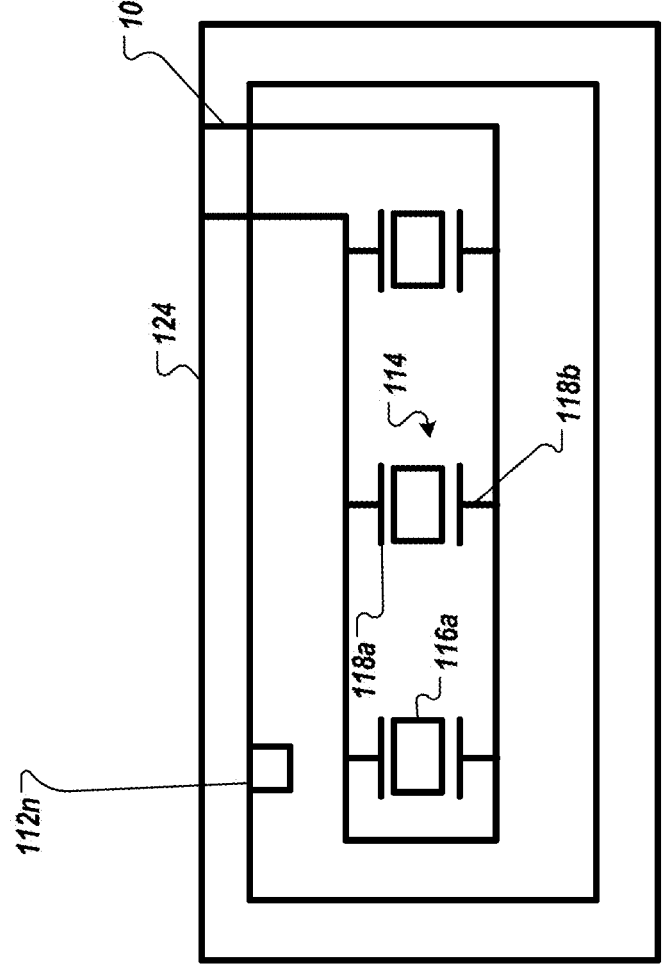
FIG. 3A is a diagram of an example of an encapsulated capacitor cell.

FIG. 3A is a diagram of an example of an encapsulated capacitor cell 102n, e.g., any capacitor cell 102, where "n" is any letter. In this disclosure, "encapsulated" means surrounded by a material that is electrically shielding, chemically shielding, physical shieling, or combination thereof. Unless otherwise indicated, encapsulated means completely surrounding.

The encapsulated capacitor cell 102n includes multiple individual capacitors 114, e.g., 100 to 500 capacitors. The capacitors 114 can be connected in parallel. When placed in parallel, the overall capacitance of multiple capacitors is the sum of the individual capacitances of each capacitor. Accordingly, the overall capacitance of the encapsulated capacitor cell 102n is greater than any individual capacitance. For example, the capacitance of an individual capacitor can have various suitable ranges, e.g., from 1,000 Farad to 2,000 Farad, and the overall capacitance of about of these capacitors can be substantially larger, e.g., about 1,200,000 Farad.

Each encapsulated capacitor can be embedded with temperature sensor, current sensor, voltage sensor, and an electronic controller to read the sensors and send data on the digital port 108, e.g., an electronic control board. Furthermore, in some implementations, the digital port 108 can receive digital instructions from the processor 106. The digital port 108 can convert digital instructions into analog signals, e.g., pulses that cause charge to flow out of a capacitor cell, making it a digitally controlled encapsulated capacitor cell.

Each capacitor 114 includes an anode 118a, a cathode 118b, and a dielectric material 116a between the anode 118a and the cathode 118b. In some implementations, the dielectric material 116a includes Teflon, ceramic, calcium, glass, or any combination thereof. The dielectric material 116a can be doped with an electrolytic solution. For example, the dielectric layer can be multiple layers of different materials or have polycrystalline crystalline structure.

In some implementations, at least one of the anode 118a and the cathode 118b include graphene, tantalum, carbon, cobalt, phosphate, aluminum oxide, and ferrous oxide, or combination thereof. In some implementations, little to no graphene is used or synthetic graphene is used, which can advantageously lower the cost of production.

The capacitance of a capacitor is partially a geometrical quantity, depending on the surface area of each of the anode 118a and the cathode 118b, and the distance between the anode 118a and the cathode 118b. For example, for a capacitor with an anode and a cathode having rectangular shape of the same size, the capacitance is proportional to the area and inversely proportional to the distance between the anode and cathode. In some implementations, the surface area of the anode and cathode is on the order of 1 nm², and the separation between the anode and cathode is about 0.4 nm. In some implementations, the encapsulated capacitor cell 102n has a non-rectangular shape, such as two concentric shells with a dielectric material between the shells.

Housing 124 can encapsulate the capacitors 114, thereby forming encapsulated capacitor cell 102n. The housing 124 can provide insulation, provide protection against the Joule effect, and provide digital isolation, e.g., prevent crosstalk between encapsulated capacitor cells 102n in the energy storage system 100, which allows for a high degree of digital control compared to if there were no housing present.

In some implementations, the housing 124 includes aluminum. The housing 124 can be 0.3 mm thick. In some implementations, the housing 124 completely covers the processor 106, the digital port 108, or both. Alternatively, in some implementations, a portion of the processor 106 is exposed. The housing 124 can be made of highly durable material such that when deployed in the field, the encapsulated capacitor cell 102n can last a long time, e.g., years.

A digital port 108 connects the encapsulated capacitor cell 102n to the processor 106 (not depicted in FIG. 2A). The digital port 108 can communicate with the CANBUS port 122 of the processor 106. In some implementations, an individual capacitor cell, e.g., an encapsulated capacitor cell, includes one or more sensors 112n within the housing to monitor the status, e.g., temperature, current, voltage, and the Hall effect, within a capacitor cell. In some implementations, the sensors 112 include analog-to-digital converters to convert analog input signals to digital signals that can communicate with the processor 106. In some implementations, the sensors 112 can send analog signals to a respective digital port 108, which will convert the signal before sending a digital signal to the processor 106. The one or more sensors 112n can be electronically coupled to the digital port 108, so that the digital port 108 can cause the sensors to collect data based on received instructions.

The digital port 108 is located within the housing 124 so that the digital port 108 is also encapsulated by the housing 124. The housing 124 encapsulating the digital port 108 makes each encapsulated capacitor cell 102n completely encapsulated and individually controllable.

The housing 124 encapsulating both the digital port 108 and the array of capacitors 114 can provide various benefits. For example, the encapsulated capacitor cell 102n will not be rendered malfunctional if a contaminate damages an exterior of the housing 124, since the digital port 108 is protected. As another example, losses associated with charge balancing between capacitors 114 can be reduced since balancing can occur within a single encapsulated capacitor cell 102n.

Based on instructions received from the processor, each digital port 108 can control current flow out of and into each encapsulated capacitor cell 102n, thereby enabling each encapsulated capacitor cell 102n to provide or store charge on demand.

Encapsulated Capacitor Cell

The dielectric material of each capacitor 114 can be a solid-state material, e.g., a solid organic polymer. FIG. 3B depicts an encapsulated capacitor cell 102f that is substantially the same as the encapsulated capacitor cell 102d, except that the dielectric material is a solid-state dielectric material 116b. Therefore, description of repeated components will be omitted. In some implementations, dielectric material of one or more capacitors is not a solid state material. For example, the dielectric material of each capacitor 114 can be Teflon, calcium, or any combination of the two.

In some implementations, the solid-state dielectric material 116b includes ceramic, calcium, glass, or combination thereof. For example, the dielectric layer can be multiple layers of different materials or have crystalline, e.g., polycrystalline, structure.

Using a solid-state dielectric material 116b and/or a combination of Teflon and calcium as the dielectric material can increase the lifespan of individual encapsulated capacitor cell 102f and thus the entire energy storage system 100, increase the tolerance of each encapsulated capacitor cell 102f for higher temperatures and signal frequencies.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Implementations and all of the functional operations and/or actions described in this specification may be implemented in digital electronic circuitry, or in computer software, firmware, or hardware, including the structures disclosed in this specification and their structural equivalents, or in combinations of one or more of them. Implementation may be implemented as one or more computer program products, e.g., one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user or driver, implementations may be implemented on one or more computers having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. For example, operations 374-380 executed by network server 330 may be executed in various orders and are not limited to the sequential order of the reference numbers assigned to the operations. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

The invention claimed is:

1. A system comprising: a plurality of capacitor cells, at least one of the plurality of capacitor cells respectively comprising at least one digital port;
   an array of switches arranged in a first matrix and connected to the plurality of capacitor cells, wherein at least two switches of the array of switches are parallel to each other in a first state of the array of switches;
   a plurality of nodes connecting the plurality of capacitor cells and the array of switches, a portion of the plurality of nodes being arranged in a second matrix;
   a power source configured to charge the plurality of capacitor cells and connect to the plurality of capacitor cells depending on a state of at least one switch in the array of switches; and
   a processor configured to:
      determine first instructions for the array of switches and second, digital instructions for each capacitor cell of the plurality of capacitor cells, and
      detect a presence of a charge imbalance and transmit the second, digital instructions to each capacitor cell of the plurality of capacitor cells,
      wherein the at least one digital port is configured to convert the second, digital instructions from the processor into at least one analog signal at a respective capacitor cell of the at least one of the plurality of capacitor cells.

2. The system of claim 1, wherein, in a closed state of the array of switches, a switch of the array of switches is connected in parallel to a node in the second matrix.

3. The system of claim 1, wherein two or more switches of the array of switches are connected in parallel to a capacitor cell of the plurality of capacitor cells.

4. The system of claim 3, wherein each switch of the array of switches is connected in parallel to a respective group of capacitor cells of the plurality of capacitor cells.

5. The system of claim 1, wherein the plurality of capacitor cells are connected to each other in series.

6. The system of claim 1, wherein each of the capacitor cells comprises a plurality of individual capacitors.

7. The system of claim 1, further comprising at least one sensor configured to monitor the plurality of capacitor cells and send data to the processor,
   wherein the processor is configured to receive the data from the processor and to determine the first instructions and the second, digital instructions using the data, and
   wherein the at least one sensor comprises at least one of a temperature sensor, a voltage sensor, a current sensor, and a Hall effect sensor.

8. The system of claim 1, wherein a resistance of a switch of the array of switches is less than 10 Ohms.

9. The system of claim 1, further comprising a floating capacitor,
   wherein, in a second state of the array of switches, the floating capacitor is connected in series with at least two capacitor cells of the plurality of capacitor cells,
   wherein, in a third state of the array of switches, the floating capacitor is disconnected from the plurality of capacitor cells excluding the at least two capacitor cells, and
   wherein the first, second, and third states are different states of the array of switches.

10. The system of claim 1, wherein there are fewer capacitor cells in the plurality of capacitor cells than there are switches in the array of switches.

11. The system of claim 1, wherein at least one switch in the array of switches comprises a metal-oxide-semiconductor field-effect transistor (MOSFET).

12. The system of claim 1, wherein at least one switch in the array of switches comprises a dry contact, and
   wherein the processor is connected to a relay board configured to switch relays of the dry contact.

13. The system of claim 1, further comprising a human machine interface (HMI) configured to send user input to the processor, display data indicative of a status of one or more of the plurality of capacitor cells, or both.

14. The system of claim 1, wherein an aluminum housing encapsulates each capacitor cell of the plurality of capacitor cells.

15. The system of claim 1, wherein each capacitor cell of the plurality of capacitor cells comprises an electronic control board to receive the second, digital instructions from the processor, and
   wherein the electronic control board comprises a digital port that does not comprise an inverter, a converter, or a rectifier.

16. The system of claim 1, wherein at least one capacitor cell of the plurality of capacitor cells comprises at least one of Teflon, calcium, and glass.

17. The system of claim 1, wherein at least one capacitor cell of the plurality of capacitor cells comprises at least one of ceramic, calcium, and glass.

18. The system of claim 1, wherein the at least two switches of the array of switches are not parallel to each other in a second state of the array of switches.

19. A system comprising:

a plurality of capacitor cells;

an array of switches arranged in a first matrix and connected to the plurality of capacitor cells, wherein at least two switches of the array of switches are parallel to each other in a first state of the array of switches;

a plurality of nodes connecting the plurality of capacitor cells and the array of switches, a portion of the plurality of nodes being arranged in a second matrix;

a power source configured to charge the plurality of capacitor cells and connect to the plurality of capacitor cells depending on a state of at least one switch in the array of switches; and a processor configured to:

determine first instructions for the array of switches and second, digital instructions for each capacitor cell of the plurality of capacitor cells, detect a presence of a charge imbalance and transmit the second, digital instructions to each capacitor cell of the plurality of capacitor cells, wherein each capacitor cell of the plurality of capacitor cells comprises a respective digital port, and wherein the processor is connected to a controller area network bus (CANBUS) port and configured to communicate with the plurality of capacitor cells through each respective digital port.

\*　\*　\*　\*　\*